US010295432B2

(12) United States Patent
Woolley et al.

(10) Patent No.: US 10,295,432 B2
(45) Date of Patent: May 21, 2019

(54) TRACER GAS AIRFLOW MEASUREMENT SYSTEM WITH HIGH TURNDOWN RATIO

(71) Applicant: THE REGENTS OF THE UNIVERSITY OF CALIFORNIA, Oakland, CA (US)

(72) Inventors: Jonathan Woolley, Davis, CA (US); Mark Modera, Piedmont, CA (US); Caton Mande, Davis, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 335 days.

(21) Appl. No.: 15/342,472

(22) Filed: Nov. 3, 2016

(65) Prior Publication Data
US 2017/0146424 A1 May 25, 2017

Related U.S. Application Data

(63) Continuation of application No. PCT/US2015/029545, filed on May 6, 2015.
(Continued)

(51) Int. Cl.
*G01M 3/20* (2006.01)
*G01M 3/22* (2006.01)
(Continued)

(52) U.S. Cl.
CPC ............... *G01M 3/22* (2013.01); *G01F 1/704* (2013.01); *G01F 1/708* (2013.01); *G01F 15/10* (2013.01);
(Continued)

(58) Field of Classification Search
CPC ........ G01M 3/22; G01M 3/222; G01M 3/223; G01M 3/205; G01F 1/704; G01F 1/708; G01F 15/10
See application file for complete search history.

(56) References Cited

U.S. PATENT DOCUMENTS 4,773,255 A 9/1988 Malcosky et al.
6,367,311 B1 4/2002 Garg
(Continued)

OTHER PUBLICATIONS

Woolley, Jonathan, "Fun with CO2 Or: 'how to destroy a laboratory accuracy MFC' Also: 'how NOT destroy the MFC'", Western Cooling Efficiency Center, University of California, Davis, Research Forum, presentation on Dec. 1, 2013, 53 pages.
(Continued)

*Primary Examiner* — Paul M. West
(74) *Attorney, Agent, or Firm* — O'Banion & Ritchey LLP; John P. O'Banion

(57) ABSTRACT

A gas injector apparatus and method for use with a tracer gas airflow measurement system that allows for large, continuous tracer gas flow rates while avoiding operation at very cold temperatures that will damage equipment. The controlled and variable heating of high pressure tracer gas flow before a gas regulator allows all points in the system to remain above freezing, and within a safe temperature range. The system has a tracer gas source and a heater that heats the gas isobarically at high pressure (>100 psi) and the hot gas is expanded across a pressure regulator to a lower working pressure to ~30 psi. The gas flow is modulated using a mass flow controller with a high turndown ratio and injected into a bulk fluid flow with an injector.

19 Claims, 2 Drawing Sheets

Related U.S. Application Data

(60) Provisional application No. 61/989,352, filed on May 6, 2014.

(51) Int. Cl.
  *G01F 1/704* (2006.01)
  *G01F 1/708* (2006.01)
  *G01F 15/10* (2006.01)

(52) U.S. Cl.
  CPC ............ *G01M 3/205* (2013.01); *G01M 3/222* (2013.01); *G01M 3/223* (2013.01)

(56) References Cited

U.S. PATENT DOCUMENTS

| | | |
|---|---|---|
| 7,207,228 B2 | 4/2007 | Wang |
| 7,258,132 B2* | 8/2007 | Henderson ......... G05D 16/2013 137/14 |
| 2003/0037596 A1 | 2/2003 | Sorenson |
| 2009/0293581 A1 | 12/2009 | Nadin et al. |
| 2012/0150455 A1 | 6/2012 | Franklin et al. |
| 2015/0276689 A1* | 10/2015 | Watanabe .............. G01N 30/06 422/89 |

OTHER PUBLICATIONS

Korean Intellectual Property Office (KIPO), International Search Report and Written Opinion, dated Aug. 24, 2015, related PCT International Application No. PCT/US2015/029545, pp. 1-15, with claims searched, pp. 16-19.

* cited by examiner

TRACER GAS AIRFLOW MEASUREMENT SYSTEM WITH HIGH TURNDOWN RATIO

CROSS-REFERENCE TO RELATED APPLICATIONS

This application is a 35 U.S.C. § 111(a) continuation of PCT international application number PCT/US2015/029545 filed on May 6, 2015, incorporated herein by reference in its entirety, which claims priority to, and the benefit of, U.S. provisional patent application Ser. No. 61/989,352 filed on May 6, 2014, incorporated herein by reference in its entirety. Priority is claimed to each of the foregoing applications.

The above-referenced PCT international application was published as PCT International Publication No. WO 2015/171821 on Nov. 12, 2015, which publication is incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

BACKGROUND

1. Technical Field

The present technology pertains generally to tracer airflow measurement systems, and more particularly to a tracer gas injection apparatus that provides large tracer gas flow rates and continuous and sustained tracer gas flow while avoiding ice formation and damage to the injection equipment while operating at very cold temperatures.

2. Background

Tracers are used to follow fluid flow in various fluid transport systems such as gas delivery lines, process flow lines and forced air duct systems. The tracer is typically delivered in the fluid transport system at a specific location upstream and then detected at some location downstream to verify the fluid flow from the upstream location. Tracer injection into the fluid transport system is usually accomplished with the tracer being injected at either a constant concentration rate or as a sharp pulse (e.g. a Dirac pulse). The detection and analysis of the downstream concentration of tracer gas may provide information about mass flow rates, dilution volumes, system leakage, and a mass residence time distribution, for example.

Tracers are also used with known duct leakage screening techniques. Duct leakage has been identified as a major source of energy loss in large commercial buildings. These methods measure air flow in ventilation ducts by using a tracer such as carbon dioxide. First, the initial concentration of carbon dioxide is determined in an upstream portion of a duct. Then a known amount of carbon dioxide is injected into the upstream portion of the duct for a period of time and the rise in concentration of carbon dioxide over any initial background concentration is detected downstream in the duct. The air flow into and out of different points in the ventilation system are measured and the differences between the measured flows can be attributed to leakage.

Tracer gas techniques offer an opportunity for very accurate measurement of airflow in residential and commercial buildings. There is a compelling need for more accurate airflow measurement methods, in part, because the efficiency of heating, cooling, and ventilation systems suffers as a result of poor airflow management.

The injector system for injecting the tracer gas into a duct described above usually comprises a pressurized tracer gas source with a valve connected to an injector hose that is disposed in the duct to rapidly deliver gas from the gas source to the bulk air flow in the duct. Alternatively, the tracer gas may be delivered to the duct by a mass flow meter or controller. The typical mass flow meter or controller has a body with an inlet and an outlet that measures the amount of tracer gas flow through the outlet or uses a proportional valve to control the flow of gasses or liquids through the outlet.

However, the mass flow meter or controller requires a pressure regulator to reduce the tracer gas pressure below ~150 psi. This reduction in pressure across a pressure regulator causes rapid isenthalpic expansion of the gas and an extreme drop in the temperature of the tracer gas which can be considerably lower than the freezing temperature of water.

Consequently, water vapor in the air surrounding the valve or controller will condense and freeze on the outer surfaces of the valves and other components. A sharp reduction in temperature of the tracer gas can also freeze small amounts of water vapor that may be present in the gas from the source of tracer gas that can cause a blockage in the interior from ice formation reducing or stopping flow of the tracer gas and potentially damaging the control components or sensors.

Accordingly, there is a need for a tracer gas mass flow system that will allow for large tracer gas flow rates and continuous and sustained gas flow while avoiding icing and operation at very cold temperatures that will damage equipment. The present technology satisfies these needs as well as others and is generally an improvement over the art.

BRIEF SUMMARY

The present technology pertains to tracer gas airflow measurement systems that allow continuous sustained high accuracy measurements of airflow across a very wide range of flow rates in a variety of scenarios. Traditional designs for tracer gas airflow measurements systems are cumbersome, can only be used in certain circumstances, and they are limited to measuring a relatively narrow band of airflow rates with high accuracy. The present technology, with the ability to add enthalpy to the tracer gas, allows for measurement of any possible range of airflow in ductwork with a better than 2% accuracy due to the continuous and sustained flow of tracer gas provided by the injector apparatus without operating at sub-freezing temperatures. Therefore, exterior ice formation, ice blockages or restrictions in the interior valve channels and damage to sensors, valve control structures and other system components can be avoided.

The present technology is able to measure such a wide range of airflows through the scalability of each component or the ability to use multiple modules simultaneously.

In a preferred embodiment, the tracer gas airflow measurement system vaporizes liquid $CO_2$ (by allowing phase change within a standard $CO_2$ cylinder), heats the $CO_2$ vapor isobarically at high pressure >100 psi, expands the hot gas across a pressure regulator to a lower working pressure (>30 psi), and then modulates gas flow using a mass flow controller with a high turndown ratio. The $CO_2$ tracer flow may be injected into an airflow volume using various injection devices and the $CO_2$ concentration can then be measured downstream. The apparatus design allows for large $CO_2$ flow rates and continuous and sustained $CO_2$ flows while also avoiding operation at very cold temperatures that will damage the system components. The controlled and variable heating of high a pressure $CO_2$ gas flow before the gas regulator allows all points in the system to remain above freezing, and within a safe temperature range.

The advantage of the technology is in its ability to conduct continuous and sustained measurements, in a variety of applications, over a range of airflow rates. Although carbon dioxide is used as a tracer gas to illustrate the apparatus, other tracer gases may be adapted for use in a variety of settings.

In one embodiment of the tracer gas airflow measurement system, the injector apparatus has a tracer gas cylinder with a source line coupled to a heater where the system heats the tracer gas isobarically at high pressure (>500 psi). The system vaporizes liquid tracer gas, such as $CO_2$, by allowing a phase change within the tracer gas cylinder. Gas emerging from the heater may be directed through a pressure regulator where the system expands the hot gas across the pressure regulator to a lower working pressure of approximately 100 psi. In another embodiment, the heated high pressure source is >100 psi and the working pressure is reduced to approximately 30 psi.

The pressure regulator may also be temperature regulated. The lower pressure gas from the regulator may be controlled by a valve or a mass flow meter or controller that is coupled to an injector hose and wand. The system preferably modulates gas flow using the mass flow controller with a high turndown ratio.

According to another aspect of the technology, a method is provided comprising heating $CO_2$ when leaving a supply bottle so that the expanding gas does not freeze over the system using the gas.

According to another aspect of the technology a new system design is provided that allows for accurate airflow measurements over a wide range of operating conditions. This design represents a major advancement for tracer gas measurement techniques which were previously limited to measurement in a narrow range of conditions.

Further objects and aspects of the technology will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWINGS

The technology described herein will be more fully understood by reference to the following drawing which is for illustrative purposes only.

DETAILED DESCRIPTION

Referring more specifically to the drawings, for illustrative purposes, embodiments of the apparatus and system for tracer gas injection into a bulk fluid flow are generally shown. One embodiment of the technology is described generally in FIG. 3 to illustrate the injector element of the system. It will be appreciated that the methods may vary as to the specific steps and sequence and the apparatus may vary as to structural details without departing from the basic concepts as disclosed herein. The method steps are merely exemplary of the order that these steps may occur. The steps may occur in any order that is desired, such that it still performs the goals of the claimed technology.

Figure 1:
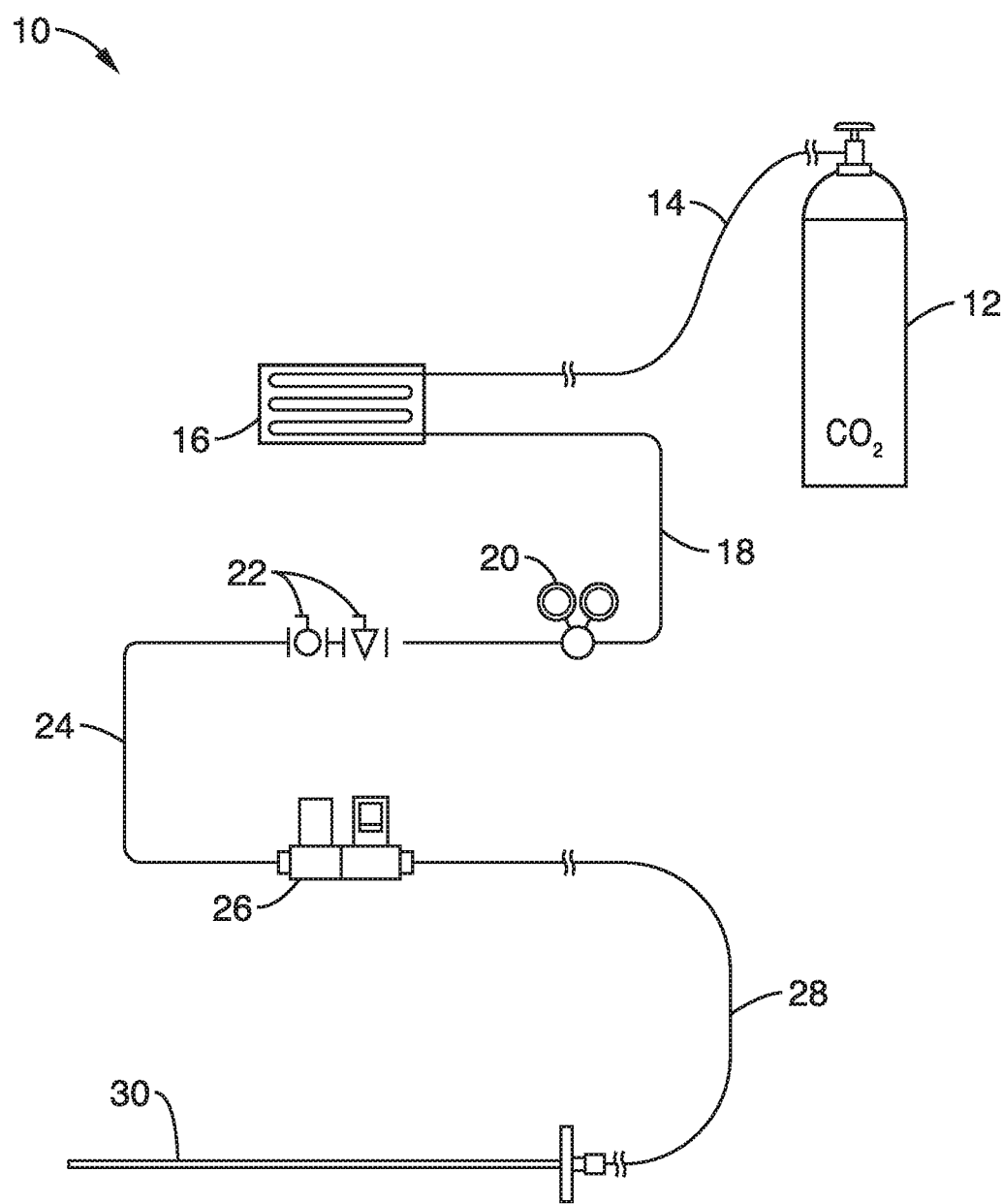
FIG. 1 is a schematic diagram of a tracer gas injector apparatus according to one embodiment of the technology.

The apparatus illustrated schematically in FIG. 1 is configured for use with leakage evaluations of forced air duct systems. In one embodiment, this injector apparatus is used as part of known methods for measuring bulk fluid flow, generally following the steps of: a) injecting an amount of a tracer upstream in a bulk fluid flow; b) detecting the concentration of the injected flow tracer at a distance downstream; and c) calculating the bulk fluid flow from the injected tracer amount and the detected tracer concentration.

Referring now to FIG. 1 the injector element 10 of the airflow measurement system is generally shown. In the embodiment shown, the injector 10 is part of a system for performing the duct air flow measurement methods described above, comprising: a) an injector apparatus for injecting tracer gas into a duct; b) a detector for detecting tracer gas concentrations downstream; and c) a computer for calculating the bulk fluid flow and other measurements. The detector may be an environmental gas analyzer, a residual gas analyzer, or a mass spectrometer.

The injector system 10 for performing the tracer injection step described above, has a pressurized tracer gas source 12, such as a canister or tank of tracer gas. The source 12 of tracer gas is preferably a high pressure source delivering gas at high-pressure. The preferred range of pressure at the tracer gas source is greater than approximately 100 psi.

In this setting, carbon dioxide is the preferred tracer gas. However, other tracer gases may also be used such as Hydrogen, Sulfur Hexafluoride, Nitrous Oxide, Methane, Octofluorocyclobutane, Bromotrifluoromethane, Perflourocarbon and Dichlorotetrafluoromethane and other tracer gases that can be conveniently detected.

A hose or tube 14 is connected to the source of tracer gas 12 on one end and to a heater 16 on the other. The heater 16 has a gas passage through which gas flows from the high-pressure gas source 12 and the tracer gas is heated isobarically at approximately the pressure of the tracer gas source 12.

The heater 16 is preferably a resistance heater that is configured to provide between 1.2-1.5 kW of heat to the gas. The heater must be able to withstand the required operating pressure (>100 psi) and provide enough enthalpy to the tracer gas such that after the pressure becomes regular, the tracer remains in gaseous form and at a temperature that will not damage or adversely affect the mass control meter or controller.

The heat is applied while the tracer gas is at a high pressure (>100 psi). Otherwise the isenthalpic expansion can damage the regulator during injections running longer than 30 seconds. The preferred temperature of the gas is between approximately 50-120 degrees Fahrenheit. Heating before the regulator is necessary to protect the regulator and mass flow controller from performance degradation while experiencing cold temperatures or freezing.

Heated high-pressure gas emerging from the heater 22 is directed through tube 18 to a regulator 20. The regulator 20 may also be temperature controlled. In one embodiment, the heated regulator 20 is also heated or cooled to provide tracer gas with the appropriate temperature and pressure for the mass flow controller.

Flow from regulator 20 to a control valve or mass flow controller 26 may optionally be controlled by ball and needle valves 22. The ball valve can shut off the flow of heated tracer gas and the needle valve will provide additional control over the flow into the valve or mass flow controller 26.

Control over the flow of tracer gas to the injection hose 28 and injector wand 30 is preferably provided by a mass flow controller 26 with a high turndown ratio. In the embodiment shown in FIG. 1, the gas is metered by a mass flow controller 26 and injected by a perforated tubular wand 30 that is disposed in an upstream end of a duct and pressurized tracer gas is released into the duct at high velocity through the wand.

Injections can also be performed through a manifold that splits into several smaller tubes that terminate in very flexible and floppy tubing. In this application the pressure from the gas causes a chaotic whipping motion of the tubes and helps in the tracer gas mix with the bulk airflow.

Figure 2:
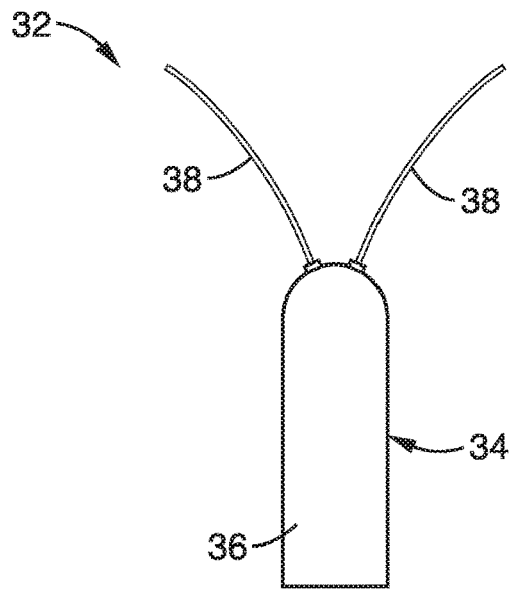
FIG. 2 is a schematic diagram of an alternative embodiment of a gas injector head with a manifold and flexible distribution tubes.

An alternative embodiment of an injection head is schematically shown in FIG. 2. The injection head 32 has a tubular body 34 connected to the injection hose 28 of the system. The body of the injection head 34 has an internal chamber or manifold 36 that is open to several flexible tubes 38 that are mounted to the body. The injection head is disposed in the bulk airflow and gas is released from the mass flow controller 24 through the injection hose 28 and into the manifold of the injection head 32. The tracer gas is emitted through the open end or openings of the flexible tubes 38 that move with the release of the gas. Movement of the flexible tubes 38 mixes the gas with the bulk fluid flow.

Figure 3:
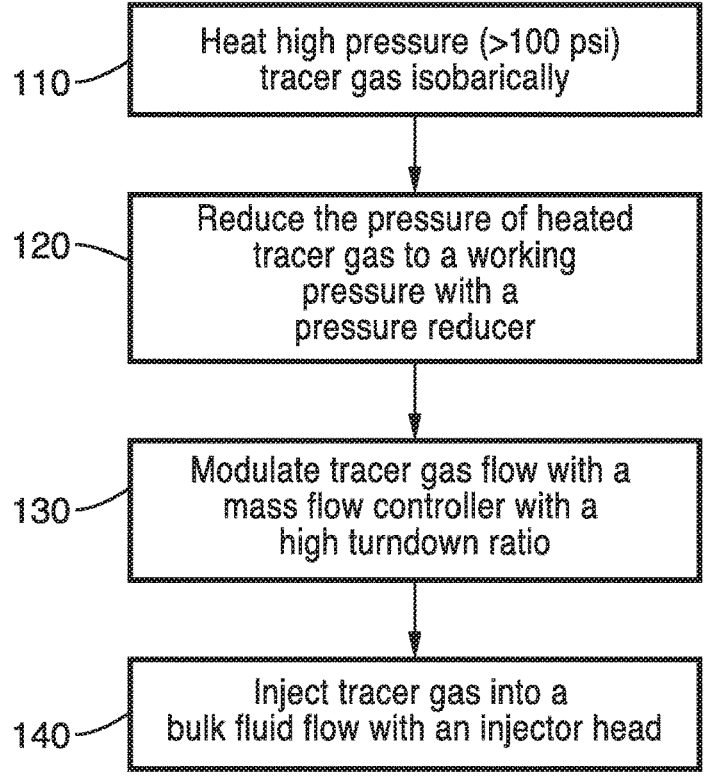
FIG. 3 is a schematic flow diagram of a method of tracer gas injection according to one embodiment of the technology.

Referring now to FIG. 3, a method 100 for continuously injecting tracer gas into a bulk airflow in a duct while avoiding operation at very cold temperatures that will damage equipment is generally shown. At block 110 of FIG. 3, tracer gas at high pressure (>100 psi) is heated isobarically. The temperature that the tracer gas is heated will depend on the physical properties of the tracer gas that is selected for use and the nature of refrigeration effect produced by that tracer gas when it is emitted though a valve orifice.

The pressure of the heated tracer gas emerging from the heating element is reduced to a working pressure with a pressure regulator or reducer at block 120. In the preferred embodiment, the working pressure of heated tracer gas is approximately 30 psi. In another embodiment, the tracer gas from the source is at a high pressure (>500 psi) and the working pressure of heated tracer gas is reduced to approximately 100 psi. The preferred working pressure ranges from approximately 30 psi to approximately 150 psi.

The pressure regulator may also be heated depending on the temperature of the tracer gas that is to be presented to the mass flow controller. In one embodiment, the pressure regulator is heated to a temperature above the freezing temperature of water to avoid ice formation and to provide additional heat to the tracer gas.

At block 130 of FIG. 3, the tracer gas flow is modulated by a valve or mass flow controller with a high turndown ratio (turndown ratio=maximum flow/minimum flow). In one embodiment, the mass flow controller has a flow meter. Tracer gas is injected into the bulk fluid flow at block 140 at volumes and injection rates metered by the mass flow controller at block 130. Injection rates of tracer gas are preferably between 0.01 and 200 standard cubic feet per minute.

The controlled and variable heating of high pressure tracer gas flow before a gas regulator allows all points in the system to remain above freezing within a safe temperature range for the sensors, meters, valves and other components of the system.

The technology described herein may be better understood with reference to the accompanying example, which is intended for purposes of illustration only and should not be construed as in any sense limiting the scope of the technology described herein as defined in the claims appended hereto.

EXAMPLE

In order to demonstrate the technology, an apparatus as shown in FIG. 1 was assembled. The tracer gas injector was set up to operate with a high pressure (~800 psi) gas cylinder. The gas was heated to approximately 100° F. before going through the pressure regulator. The pressure regulator dropped the heated tracer gas pressure to around 125 psi and the temperature of the gas dropped to approximately 90° F.

The $CO_2$ tracer gas was injected into a test duct 10 inches downstream of an upstream flow straightener throughout the cross sectional area of the duct with a tubing tree with 40 injection points to distribute the $CO_2$ tracer gas. The bulk airflow moving through the duct was sampled 2 feet downstream of the downstream flow straightener through an 8 point space average aspirated array.

Tests were run at 3 different airflows: 3100, 4000, and 5000 CFM. In this operating range, the accuracy of the nozzle box is ±0.5% of the reading. All tests agreed within the uncertainty of both the tracer gas system and the nozzle box. For all 3 tests, the tracer gas system had an uncertainty better than ±1.85% of reading. Test results were compared to the nozzle box installed in WCEC test chamber that meets ANSI/ASHRAE Standard 37-2005 Section 5.3 standard.

During each test, $CO_2$ tracer gas was injected continuously for about 5 minutes with no adverse effects on the injector equipment being observed.

From the discussion above it will be appreciated that the technology described herein can be embodied in various ways, including the following:

1. An apparatus for injecting tracer gas into a bulk fluid flow, comprising: (a) a source of high pressure tracer gas, the tracer gas having a pressure greater than approximately 100 psi; (b) a heating element fluidly coupled to the source of tracer gas configured to heat the tracer gas isobarically at a first pressure; (c) a pressure regulator fluidly coupled to the heating element, the regulator configured to reduce the pressure of the heated tracer gas to a second pressure; (d) at least one control valve fluidly coupled to the pressure regulator; and (e) an injector head fluidly coupled to the control valve; (f) wherein the control valve modulates a flow of tracer gas emitted through the injector head.

2. The apparatus of any preceding embodiment, wherein the source of tracer gas comprises a pressurized canister and a shutoff valve.

3. The apparatus of any preceding embodiment, wherein the pressure regulator comprises a heated pressure regulator.

4. The apparatus of any preceding embodiment, further comprising a shut off valve configured to control the flow of heated tracer gas between the pressure regulator and the control valve.

5. The apparatus of any preceding embodiment, further comprising a needle valve disposed between the pressure regulator and the control valve, the needle valve configured to regulate the flow of heated tracer gas into the control valve.

6. The apparatus of any preceding embodiment, wherein the control valve is selected from the group consisting of a mass flow controller, a proportional control valve and a servo valve.

7. The apparatus of any preceding embodiment, wherein the control valve comprises: a mass flow controller with a high turndown ratio; and a mass flow meter; wherein the apparatus modulates tracer gas flow using the mass flow controller.

8. The apparatus of any preceding embodiment, wherein the injector head comprises a perforated tubular wand.

9. The apparatus of any preceding embodiment, wherein the injector head comprises: a manifold body with a central chamber and a plurality of openings; and flexible tubes disposed in the openings of the manifold body; wherein tracer gas is emitted through the central chamber and out an open end of the flexible tubes.

10. A method of injecting a volume of tracer gas into a bulk fluid flow, the method comprising: (a) heating pressurized tracer gas isobarically at a first pressure greater than 100 psi; (b) reducing the pressure of heated tracer gas to a second pressure with a pressure reducer; (c) modulating tracer gas flow with a mass flow controller with a high turndown ratio; and (d) injecting tracer gas into a bulk fluid flow with an injector head; (e) wherein temperature of the pressure reducer and the mass flow controller does not drop below the freezing point of water.

11. The method of any preceding embodiment, wherein the second pressure is approximately 30 psi.

12. The method of any preceding embodiment, wherein the first pressure is greater than approximately 500 psi and the second pressure is approximately 100 psi.

13. The method of any preceding embodiment, further comprising: heating the pressure reducer to a temperature above approximately 32° F.

14. The method of any preceding embodiment, wherein the pressure regulator comprises a heated pressure regulator.

15. The method of any preceding embodiment, wherein the injector head comprises: a manifold body with a central chamber and a plurality of openings; and flexible tubes disposed in the openings of the manifold body; wherein tracer gas is emitted through the central chamber and out an open end of the flexible tubes; and wherein the injected tracer gas is mixed into a bulk fluid stream with the flexible tubes of the injector head.

16. A tracer gas injector apparatus for an airflow measurement system, comprising: a $CO_2$ cylinder coupled with a heating element; a pressure regulator communicating with an output duct of the heating element; and a mass flow controller; wherein the system vaporizes liquid $CO_2$ by allowing phase change within the $CO_2$ cylinder; wherein the system heats the $CO_2$ vapor isobarically at high pressure (>100 psi); wherein the system expands the hot gas across the pressure regulator to a lower working pressure; and wherein the system modulates gas flow using the mass flow controller with a high turndown ratio.

17. The apparatus of any preceding embodiment, wherein the pressure regulator comprises a heated pressure regulator.

18. The apparatus of any preceding embodiment, further comprising a shut off valve configured to control the flow of heated $CO_2$ gas between the pressure regulator and the control valve.

19. The apparatus of any preceding embodiment, further comprising a needle valve disposed between the pressure regulator and the control valve, the needle valve configured to regulate the flow of heated $CO_2$ gas into the control valve.

20. The apparatus of any preceding embodiment, wherein the control valve is selected from the group consisting of a mass flow controller, a proportional control valve and a servo valve.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural, chemical, and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for injecting tracer gas into a bulk fluid flow, comprising:
   (a) a source of high pressure tracer gas, said tracer gas having a pressure greater than approximately 100 psi;
   (b) a heating element fluidly coupled to the source of tracer gas configured to heat the tracer gas isobarically at a first pressure;
   (c) a pressure regulator fluidly coupled to the heating element, the regulator configured to reduce the pressure of said heated tracer gas to a second pressure;
   (d) at least one control valve fluidly coupled to the pressure regulator;
   (e) an injector head fluidly coupled to the control valve;
   (f) wherein said control valve modulates a flow of tracer gas emitted through said injector head; and
   (g) a shut off valve configured to control the flow of heated tracer gas between said pressure regulator and said control valve.

2. The apparatus as recited in claim 1, wherein said source of tracer gas comprises a pressurized canister and a shutoff valve.

3. The apparatus as recited in claim 1, wherein said pressure regulator comprises a heated pressure regulator.

4. The apparatus as recited in claim 1, further comprising a needle valve disposed between said pressure regulator and said control valve, said needle valve configured to regulate the flow of heated tracer gas into said control valve.

5. The apparatus as recited in claim 1, wherein said control valve is selected from the group consisting of a mass flow controller, a proportional control valve and a servo valve.

6. An apparatus for injecting tracer gas into a bulk fluid flow, comprising:
   (a) a source of high pressure tracer gas, said tracer gas having a pressure greater than approximately 100 psi;

(b) a heating element fluidly coupled to the source of tracer gas configured to heat the tracer gas isobarically at a first pressure;
(c) a pressure regulator fluidly coupled to the heating element, the regulator configured to reduce the pressure of said heated tracer gas to a second pressure;
(d) at least one control valve fluidly coupled to the pressure regulator; and
(e) an injector head fluidly coupled to the control valve;
(f) wherein said control valve modulates a flow of tracer gas emitted through said injector head;
(g) wherein said control valve comprises:
a mass flow controller with a high turndown ratio; and
a mass flow meter; and
(h) wherein the apparatus modulates tracer gas flow using the mass flow controller.

7. An apparatus for injecting tracer gas into a bulk fluid flow, comprising:
(a) a source of high pressure tracer gas, said tracer gas having a pressure greater than approximately 100 psi;
(b) a heating element fluidly coupled to the source of tracer gas configured to heat the tracer gas isobarically at a first pressure;
(c) a pressure regulator fluidly coupled to the heating element, the regulator configured to reduce the pressure of said heated tracer gas to a second pressure;
(d) at least one control valve fluidly coupled to the pressure regulator; and
(e) an injector head fluidly coupled to the control valve;
(f) wherein said control valve modulates a flow of tracer gas emitted through said injector head; and
(g) wherein said injector head comprises a perforated tubular wand.

8. An apparatus for injecting tracer gas into a bulk fluid flow, comprising:
(a) a source of high pressure tracer gas, said tracer gas having a pressure greater than approximately 100 psi;
(b) a heating element fluidly coupled to the source of tracer gas configured to heat the tracer gas isobarically at a first pressure;
(c) a pressure regulator fluidly coupled to the heating element, the regulator configured to reduce the pressure of said heated tracer gas to a second pressure;
(d) at least one control valve fluidly coupled to the pressure regulator; and
(e) an injector head fluidly coupled to the control valve;
(f) wherein said control valve modulates a flow of tracer gas emitted through said injector head;
(g) wherein said injector head comprises:
a manifold body with a central chamber and a plurality of openings; and
flexible tubes disposed in said openings of said manifold body; and
(h) wherein tracer gas is emitted through said central chamber and out an open end of said flexible tubes.

9. A method of injecting a volume of tracer gas into a bulk fluid flow, the method comprising:
(a) heating pressurized tracer gas isobarically at a first pressure greater than 100 psi;
(b) reducing the pressure of heated tracer gas to a second pressure with a pressure reducer;
(c) modulating tracer gas flow with a mass flow controller with a high turndown ratio; and
(d) injecting tracer gas into a bulk fluid flow with an injector head;
(e) wherein temperature of said pressure reducer and said mass flow controller does not drop below the freezing point of water.

10. The method as recited in claim 9, wherein said second pressure is approximately 30 psi.

11. The method as recited in claim 9, wherein said first pressure is greater than approximately 500 psi and said second pressure is approximately 100 psi.

12. The method as recited in claim 9, further comprising:
heating the pressure reducer to a temperature above 32° F.

13. The method as recited in claim 9, wherein said pressure reducer comprises a heated pressure regulator.

14. The method as recited in claim 9, wherein said injector head comprises:
a manifold body with a central chamber and a plurality of openings; and
flexible tubes disposed in said openings of said manifold body;
wherein tracer gas is emitted through said central chamber and out an open end of said flexible tubes; and
wherein said injected tracer gas is mixed into a bulk fluid stream with said flexible tubes of the injector head.

15. A tracer gas injector apparatus for an airflow measurement system, comprising:
a $CO_2$ cylinder coupled with a heating element;
a pressure regulator communicating with an output duct of the heating element; and
a control valve;
wherein the system vaporizes liquid $CO_2$ by allowing phase change within the $CO_2$ cylinder;
wherein the system heats the $CO_2$ vapor isobarically at high pressure (>100 psi);
wherein the system expands the hot gas across the pressure regulator to a lower working pressure; and
wherein the system modulates gas flow using the mass flow controller with a high turndown ratio.

16. The apparatus as recited in claim 15, wherein said pressure regulator comprises a heated pressure regulator.

17. The apparatus as recited in claim 15, further comprising a shut off valve configured to control the flow of heated $CO_2$ gas between said pressure regulator and said control valve.

18. The apparatus as recited in claim 17, further comprising a needle valve disposed between said pressure regulator and said control valve, said needle valve configured to regulate the flow of heated $CO_2$ gas into said control valve.

19. The apparatus as recited in claim 15, wherein said control valve is selected from the group consisting of a mass flow controller, a proportional control valve and a servo valve.

* * * * *